(12) United States Patent
Griffith et al.

(10) Patent No.: US 7,766,431 B2
(45) Date of Patent: Aug. 3, 2010

(54) SYSTEM AND METHOD FOR AN AUTOBRAKE FUNCTION FOR AN AIRCRAFT ELECTRIC BRAKE SYSTEM

(75) Inventors: T. Todd Griffith, Seattle, WA (US); Andreea D. Uta, Mukilteo, WA (US); John Gowan, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 625 days.

(21) Appl. No.: 11/741,712

(22) Filed: Apr. 27, 2007

(65) Prior Publication Data
US 2008/0149436 A1 Jun. 26, 2008

Related U.S. Application Data

(60) Provisional application No. 60/871,744, filed on Dec. 22, 2006.

(51) Int. Cl.
*B60T 8/86* (2006.01)
(52) U.S. Cl. .......................................... 303/126; 303/20
(58) Field of Classification Search ................ 303/9.61, 303/20, 126, 199, DIG. 9; 701/16, 70; 244/110 A, 244/110 H, 111
See application file for complete search history.

(56) References Cited

U.S. PATENT DOCUMENTS

| 5,024,491 A * | 6/1991 | Pease et al. .................. 303/126 |
| 6,095,293 A | 8/2000 | Brundett et al. |
| 6,702,069 B2 | 3/2004 | Ralea et al. |
| 6,820,946 B2 * | 11/2004 | Salamat et al. ......... 303/DIG. 9 |
| 7,618,100 B2 * | 11/2009 | Griffith et al. ................ 303/126 |
| 2008/0154470 A1 * | 6/2008 | Goranson et al. ............. 701/70 |

FOREIGN PATENT DOCUMENTS

WO PCT/US2007/088470 12/2007

* cited by examiner

*Primary Examiner*—Thomas J Williams
(74) *Attorney, Agent, or Firm*—Tung & Associates

(57) ABSTRACT

A system and methods for an electric autobrake function suitable for use with an aircraft is disclosed. The system includes a single master autobrake channel configured to generate a master autobrake command and a plurality of slave autobrake channels configured to receive the autobrake master command. The methods receive autobrake command actuation data, compute a common autobrake master command based upon the autobrake command actuation data, and synchronize brake application by utilizing the common autobrake master command to actuate all brake actuators.

15 Claims, 3 Drawing Sheets

SYSTEM AND METHOD FOR AN AUTOBRAKE FUNCTION FOR AN AIRCRAFT ELECTRIC BRAKE SYSTEM

CROSS-REFERENCES TO RELATED APPLICATIONS

This application claims the benefit of U.S. Provisional Application No. 60/871,744, filed Dec. 22, 2006.

TECHNICAL FIELD

Embodiments of the present invention relate generally to an electric brake system for an aircraft. More particularly, embodiments of the present invention relate to an autobrake function for an electric brake system of an aircraft.

BACKGROUND

Many aircraft utilize brake systems having brake mechanisms that are controlled by direct cable or hydraulic control architectures. Modern aircraft are beginning to replace conventional cable actuated and hydraulic actuated aircraft brake systems with electrically actuated and electrically controlled brake systems.

Advanced airplanes use an autobrake function to automatically apply brakes. The autobrake frees the pilot to perform other tasks during takeoff or landing at times when the brake system can be handled by an automated system. An autobrake system should be designed with safety features. Particularly, an aircraft brake system should include sufficient independent and redundant processing to provide reliable brake control and robustness. With independent channel based control of an electric aircraft brake system, an identical autobrake command output from all independent channels is desirable to ensure synchronous brake application.

BRIEF SUMMARY

A system and methods for an electric autobrake function suitable for use with an aircraft is disclosed. In one embodiment, the autobrake control functionality will only be enabled on one of a plurality of brake system control channels to ensure symmetric brake application. The system includes a master autobrake channel configured to generate a master autobreak command and a plurality of slave autobrake channels configured to receive the autobrake master command. The master channel receives autobrake command actuation data, computes the autobrake master command based upon the autobrake command actuation data, and synchronizes brake application by generating a common autobrake master command for all brake actuators to apply brakes to all aircraft wheels at the same time.

The above and other aspects may be carried out in one embodiment by a method for an autobrake function for an electric brake system. The method includes receiving autobrake command actuation data, computing an autobrake master command based upon the autobrake command actuation data, sending the autobrake master command to slave autobrake channels, generating a slave autobrake control signal for each of the slave autobrake channels in response to the autobrake master command; and controlling actuation of each of the slave autobrake channel brake actuators with the slave autobrake control signal.

The above and other aspects of the invention may be carried out in another embodiment by another method for an autobrake function for an electric brake system. The method includes receiving autobrake command actuation data, computing an autobrake master command based upon the autobrake command actuation data, and synchronizing brake application in response to the autobrake master command.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1:
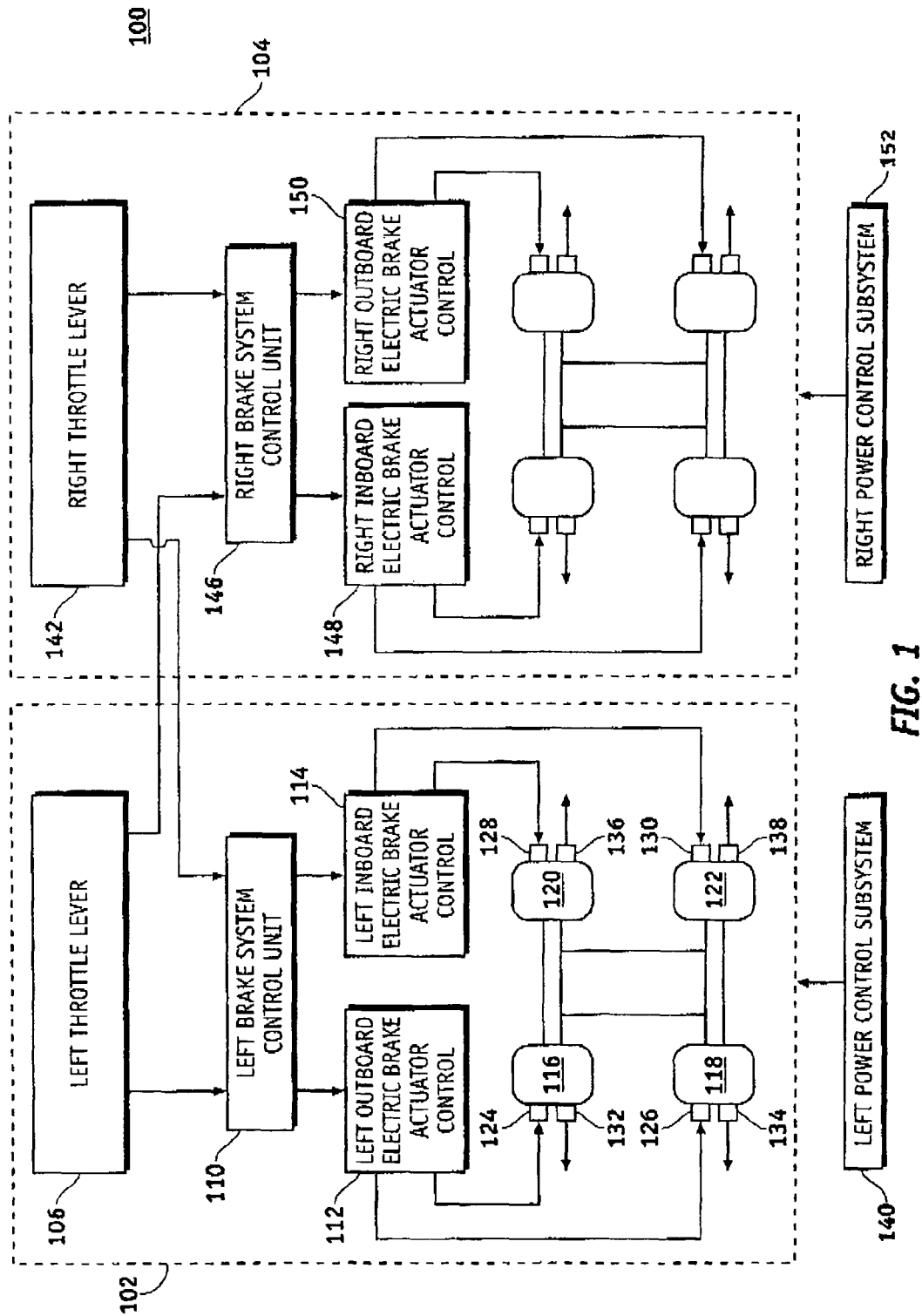
FIG. 1 is a schematic representation of an aircraft electric brake system.

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with a variety of different aircraft brake systems and aircraft configurations, and that the system described herein is merely one example embodiment of the invention.

For the sake of brevity, conventional techniques and components related to signal processing, aircraft brake systems, brake system controls, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-2 depict example arrangements of elements, additional intervening elements, devices, features, or components may be present in an embodiment of the invention.

An aircraft as described herein employs an electric autobrake system, which may be powered by any suitable power supply, such as a main aircraft battery, or an active aircraft power supply that is operational when the aircraft engine(s) are running. An autobrake is a type of automatic brake system for airplanes. The autobrake frees the pilot to perform other tasks during takeoff or landing at times when the aircraft's brake system can be handled by automated systems. When landing, the autobrake allows the pilot to monitor other systems and control the airplane while the braking is handled automatically. The aircraft automatically engages wheel braking upon touchdown on the runway. An additional advantage of engaging the autobrake instead of manually pressing on brake pedals is the uniform deceleration made possible by the automatic brake control mechanism. The degree of braking may be selected, and the aircraft automatically decelerates at the selected level regardless of other deceleration factors such as aircraft drag, thrust reversers, or spoilers. When taking off, the aircraft's autobrake can be set to a rejected takeoff (RTO) mode. When in the RTO setting, the aircraft monitors certain status indicators and engages RTO braking depending on those indicators. For example, if thrust reversing is activated, or if the pilot returns the throttle to the "idle" position. The electric autobrake system includes an autobrake function that computes an autobrake master command on a single master channel. The autobrake function feature is suitably configured to publish the autobrake master command on slave autobrake channels. Thus, the autobrake function feature generates a common autobrake master command for all brake actuators so that the brakes are applied uniformly to all aircraft wheels at the same time.

Figure 2:
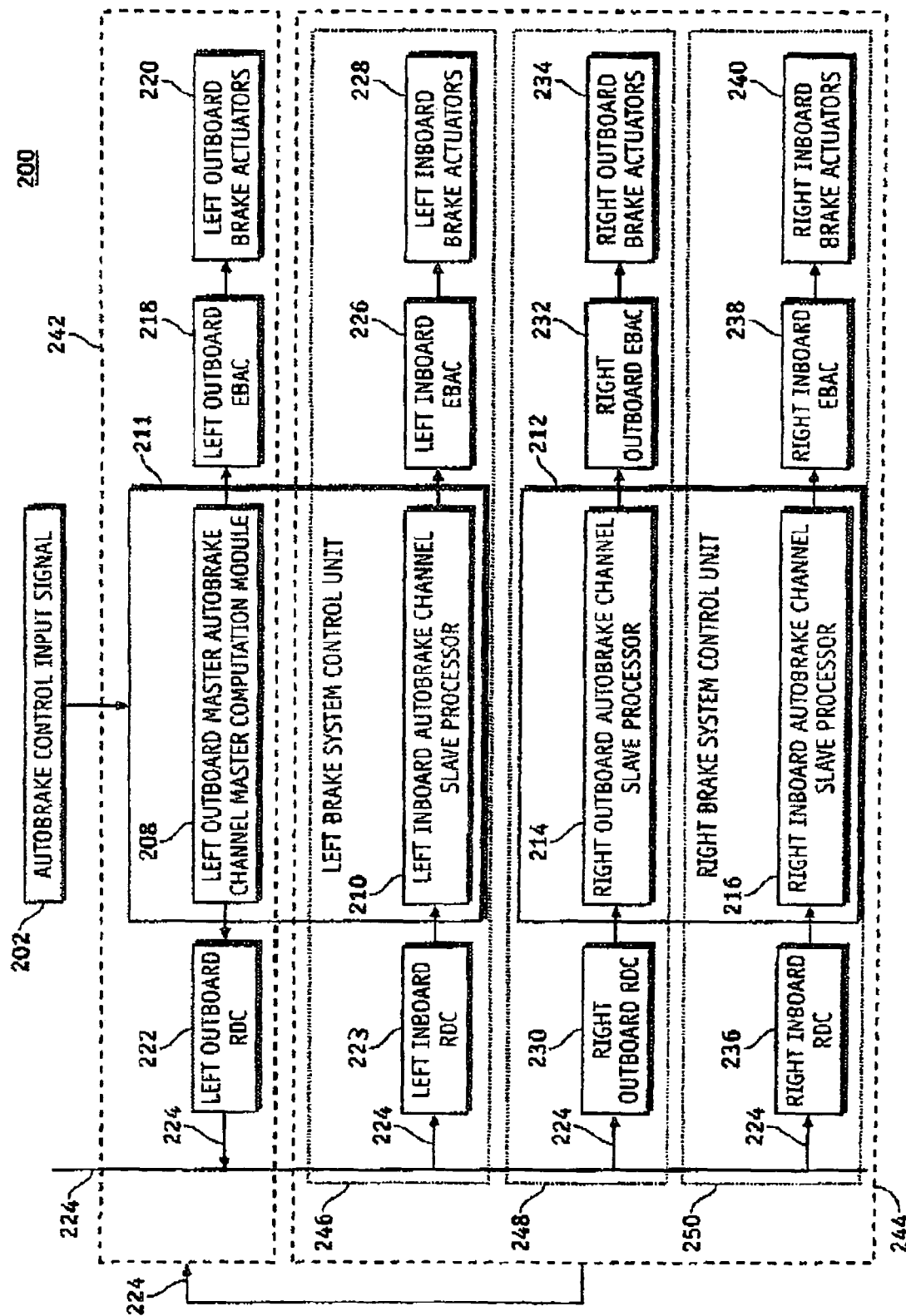
FIG. 2 is a schematic representation of a system for an electric autobrake function for an aircraft electric brake system.

FIG. 1 is a schematic representation of an example embodiment of an electric brake system 100 for an aircraft. In the example embodiment shown in FIG. 1, the aircraft employs a left electric brake subsystem architecture 102 and a right electric brake subsystem architecture 104, which are similarly configured. The terms "left" and "right" refer to the port and starboard of the aircraft, respectively. In practice, the two subsystem architectures 102/104 may be independently controlled in the manner described below. For simplicity, only left electric brake subsystem architecture 102 is described in detail below. It should be appreciated that the following description also applies to right electric brake subsystem architecture 104.

For this example deployment, left electric brake subsystem architecture 102 generally includes: a throttle lever 106; a brake system control unit (BSCU) 110; an outboard electric brake actuator control (EBAC) 112 coupled to BSCU 110; an inboard EBAC 114 coupled to BSCU 110; an outboard wheel group that includes a fore wheel 116 and an aft wheel 118; an inboard wheel group that includes a fore wheel 120 and an aft wheel 122; electric brake mechanisms (not shown in FIG. 1) coupled to the EBACs; and remote data concentrators (reference numbers 132, 134, 136, and 138). Each electric brake mechanism includes at least one electric brake actuator (reference numbers 124, 126, 128 and 130) that is controlled by the respective EBAC. The electric brake mechanisms and the remote data concentrators correspond to each wheel of left electric brake subsystem architecture 102. Although not shown in FIG. 1, an embodiment may have more than one electric brake mechanism and more than one remote data concentrator per wheel.

Electric brake system 100 can be applied to any number of electric braking configurations for an aircraft, and electric brake system 100 is depicted in a simplified manner for ease of description. An embodiment of electric brake system 100 as deployed may include any number of BSCUs, any number of EBACs coupled to and controlled by each BSCU, and any number of brake mechanisms for each wheel (or for each group of wheels). In operation, electric brake system 100 can independently generate and apply brake actuator control signals for each wheel of the aircraft or concurrently for any group of wheels.

The elements in left electric brake subsystem architecture 102 can be coupled together using a data communication bus or any suitable interconnection arrangement or architecture. For example, a digital data communication bus or buses may be configured to communicate EBAC control signals from BSCU 110 to the EBACs, to communicate brake mechanism control signals (e.g., actuator control signals) from the EBACs to the electric brake actuators 124/126/128/130, etc. Briefly, BSCU 110 reacts to manipulation of throttle levers 106/142 and generates control signals that are received by EBACs 112/114. In turn, EBACs 112/114 generate brake mechanism control signals that are received by electric brake mechanisms and in particular by the actuators 124/126/128/130. In turn, the electric brake actuators 124/126/128/130 engage to impede or prevent rotation of the respective wheels. These features and components are described in more detail below.

Throttle levers 106 and 142 are configured to provide inputs to electric brake system 100. A pilot may physically manipulate throttle lever(s) 106 and/or 142, resulting in rotation or movement (i.e., some form of physical input) of throttle lever(s) 106 and/or 142. Electric brake system 100 (and BSCU 110 in particular) may be configured to prevent the application of autobrakes if the thrust levers are not at idle as explained in detail in context of FIG. 4 below. This physical rotation or throttle resolver angle (TRA) is measured from its natural position by one or more throttle sensors, the common core system remote data concentrator (CCS-RDC), or an equivalent component. The sensor data is processed by the Electronic Engine Controllers (EECs) and then sent out on the airplane digital data bus. The common core system remote data concentrator (CCS-RDC) gateways this data to the BSCU 110. The BSCU control signal may convey a desired autobraking condition for brake actuators 124/126/128/130, or may disable brake actuators 124/126/128/130 as explained in detail in the context of FIG. 4 below.

An embodiment of electric brake system 100 may use any number of BSCUs 110. For ease of description, this example includes only one BSCU 110. BSCU 110 is an electronic control unit that has embedded software that digitally computes EBAC control signals that represent braking commands. The electrical and software implementation allows further optimization and customization of braking performance and feel if needed for the given aircraft deployment.

BSCU 110 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration. In one embodiment, BSCU 110 is implemented with a computer processor (such as a PowerPC 555) that hosts software and provides external interfaces for the software.

BSCU 110 monitors various aircraft inputs to provide control functions such as, without limitation: pedal braking; parking braking; automated braking; and gear retract braking. In addition, BSCU 110 blends antiskid commands (which could be generated internally or externally relative to BSCU 110) to provide enhanced control of braking. BSCU 110 obtains pilot command control signals from brake pedals (not shown in FIG. 1), along with additional command control signals such as input from both throttle levers 106/142, air/ground indication, groundspeed and speedbrake position. BSCU 110 may also receive wheel data (e.g., wheel speed, rotational direction, tire pressure, etc.) from remote data concentrators 132/134/136/138. BSCU 110 processes its input signals and generates one or more EBAC control signals that are received by EBACs 112/114. In practice, BSCU 110 transmits the EBAC control signals to EBACs 112/114 via a digital data bus. In a generalized architecture (not shown), each BSCU can generate independent output signals for use with any number of EBACs under its control.

BSCU 110 is coupled to EBACs 112/114 in this example. Each EBAC 112/114 may be implemented, performed, or realized in the manner described above for BSCU 110. In one embodiment, each EBAC 112/114 is realized with a computer processor (such as a PowerPC 555) that hosts software, provides external interfaces for the software, and includes suitable processing logic that is configured to carry out the various EBAC operations described herein. Each EBAC 112/114 obtains EBAC control signals from BSCU 110, processes the EBAC control signals, and generates the brake mechanism control signals (brake actuator signals) for its associated electric brake mechanisms.

Notably, the functionality of BSCU 110 and EBACs 112/114 may be combined into a single processor-based feature or component. In this regard, BSCU 110, EBAC 112, EBAC 114, or any combination thereof can be considered to be an autobrake control architecture for electric brake system 100. Such an autobrake control architecture includes suitably configured processing logic, functionality, and features that support the autobrake control operations described herein.

Each wheel may include an associated electric brake mechanism, and each brake mechanism may include one or more electric brake actuators. Consequently, autobraking for each wheel may be independently and individually controlled by electric brake system 100. Each electric brake actuator is suitably configured to receive actuator control signals from its respective EBAC, wherein the actuator control signals influence adjustment of the electric brake actuator. In this embodiment, each electric brake actuator in electric brake system 100 is coupled to and controlled by an EBAC. In this manner, EBACs 112/114 control the electric brake actuators to apply, release, modulate, and otherwise control the application of the wheel brakes. In this regard, EBACs 112/114 generate the control signals for the brake actuators in response to the respective command signals generated by BSCU 110. The autobrake control signals are suitably formatted and arranged for compatibility with the particular braking system utilized by the aircraft. Those skilled in the art are familiar with aircraft brake mechanisms and the general manner in which the autobrake function controls brakes and such known aspects will not be described in detail here.

The left electric brake subsystem architecture 102 may include or cooperate with a suitably configured power control subsystem 140. Power control subsystem 140 may be coupled to BSCU 110, to EBACs 112/114 (and/or to other components of electric brake system 100). In this embodiment, power control subsystem 140 is suitably configured to provide, apply, remove, switch, or otherwise regulate the operating power for the electric brake mechanisms and/or the electric brake actuators as needed. For example, power control subsystem 140 can remove power from EBACs 112/114 and/or other components of left electric brake subsystem architecture 102 as needed to provide an interlock feature for electric brake system 100. As described in more detail below, power control subsystem 140 may be implemented with a left outboard power supply unit and a left inboard power supply unit that function in an independent manner to regulate operating power for the left outboard and left inboard electric brake components.

Right electric brake subsystem architecture 104 has a structure that is similar to left electric brake subsystem architecture 102 (common features, functions, and elements will not be redundantly described here). For this example deployment, as shown in FIG. 1, right electric brake subsystem architecture 104 includes: a right throttle lever 142 that is separate and distinct from throttle lever 106; a BSCU 146; an inboard EBAC 150; an outboard EBAC 148; and a power control subsystem 152 that is separate and distinct from power control subsystem 140. The two sides of electric brake system 100 receive autobrake brake actuation data from both throttle levers 106/142. Alternatively, the two sides of electric brake system 100 may utilize other separate and distinct autobrake actuation mechanisms (not shown in FIG. 1). These various components of right electric brake subsystem architecture 104 are coupled together to operate as described above for left electric brake subsystem architecture 102, however, the right-side processing is preferably independent of the left-side processing.

A control mechanism or architecture in the electric brake system can be designed to implement the autobrake function feature according to one example embodiment. For example, electric brake system 100 may be configured to support the autobrake function implementation on a single master channel as shown in the context of FIG. 2 below.

FIG. 2 is a schematic representation of a system 200 for an electric autobrake function for an aircraft electric brake system configured in accordance with an embodiment of the invention. The electric brake system may also be configured as described above in the context of FIG. 1. Accordingly, certain features, components, and functions of system 200 will not be redundantly described here.

System 200 for an electric autobrake function may include a master autobrake channel 242 configured to perform a closed loop autobrake control algorithm, where the control algorithm generates a master autobrake command, and a plurality of slave autobrake channels 244 configured to receive the autobrake master command via aircraft network bus 224.

The master autobrake channel 242 may include a master autobrake channel left outboard brake system control unit (BSCU) 211, a master autobrake channel left outboard electric brake actuator control (EBAC) 218, at least one master autobrake channel left outboard brake actuator 220 and a master autobrake channel left outboard remote data concentrator (RDC) 222. System 200 is suitably configured to receive or process autobrake control input signals 202.

Master autobrake channel left outboard brake system control unit (BSCU) 211 has an architecture similar to BSCU 110 and may include a left outboard master autobrake command computation module 208. In this example, autobrake control input signals 202 are received by the left outboard master autobrake command computation module 208. For example, both the left and right TRA sensor digital data modules (not shown in FIG. 2) provide thrust lever position data to the outboard master autobrake command computation module 208.

Left outboard master autobrake command computation module 208 is coupled to the master autobrake channel left outboard BSCU 211 and is suitably configured to compute/generate an autobrake master command in response to the autobrake actuation data. The left outboard master autobrake command computation module 208 is further configured to delay application of autobrakes on the master autobrake channel, by delaying the transmission of the autobrake master command to the EBACs, in order to assure synchronous brake application across all aircraft wheel brakes as explained in the context of FIG. 3 below.

Left outboard EBAC 218 has an architecture similar to EBAC 112. The left outboard EBAC 218 is coupled to the master autobrake channel left outboard BSCU 211 and is configured to receive the delayed autobrake master command and to generate a control signal in response to the delayed autobrake master command. The master autobrake channel EBAC controls a portion of EBACs which is configured to receive the delayed autobrake master command. The control signal is configured to control actuation of left outboard brake actuators 220. In practice, the autobrake control signals modulate the actuation of the electric brake actuators (i.e., the percentage of full clamping force imparted by the electric brake actuators). For example, an autobrake control signal may command the electric brake actuators to release brakes it may command the electric brake actuators to apply full clamping force, or it may command the electric brake actuators to apply some intermediate clamping force.

Left outboard RDC 222 is coupled to the left outboard master autobrake channel left outboard BSCU 211 and is configured to receive the autobrake master command. The left outboard RDC is further configured to send the autobrake master command to the slave autobrake channels via the RDCs connected to each slave autobrake channel. As mentioned above, this data communication may be carried over the network bus 224.

System 200 may include a plurality of slave autobrake channels 244 configured to receive the autobrake master command via aircraft network bus 224. Each of the slave autobrake channels commands a brake application based on the received autobrake master command without any further processing, with an exception of antiskid adjustment. The slave autobrake channels are also configured to send their health status to the master autobrake channel via the network bus 224. In this regard, if there is any kind of error or fault (e.g., antiskid not working, reduced braking capability, uncommanded clamping force, etc.) the master autobrake channel will disarm the autobrake (i.e., discontinue transmission of a master autobrake command to the slave autobrake channels) in order to ensure safety of the aircraft. Braking in this case will be controlled by the pilot via the brake pedals. Each slave autobrake channel has an architecture similar to the left outboard master autobrake channel and each may also be configured as described above in the context of FIG. 1. Accordingly, certain features, components, and functions of system 200 will not be redundantly described here.

System 200 may include a left inboard autobrake slave channel 246, a right outboard autobrake slave channel 248, and a right inboard autobrake slave channel 250. Each autobrake slave channel 246/248/250 includes a respective autobrake channel slave processor 210/214/216 coupled to one of the BSCUs 211/212 and configured to receive the autobrake master command via the respective RDCs 223/230/236. The autobrake channel slave processors 210/214/216, unlike the master autobrake channel master computation module 208, do not perform any autobrake command computation. Each autobrake channel slave processor 210/214/216 sends the autobrake master command to the respective EBAC 226/232/238. Each EBAC 226/232/238 is configured to generate a control signal in response to the autobrake master command to control actuation of each respective brake actuators 228/234/240. Although, in this example, the master channel computation module is implemented on the left outboard BSCU channel, the master channel computation module may alternatively or additionally be implemented on any of the other present brake control channels (left inboard, right outboard or right inboard) instead. The process of generating the master autobrake command of the autobrake function is described below.

Figure 3:
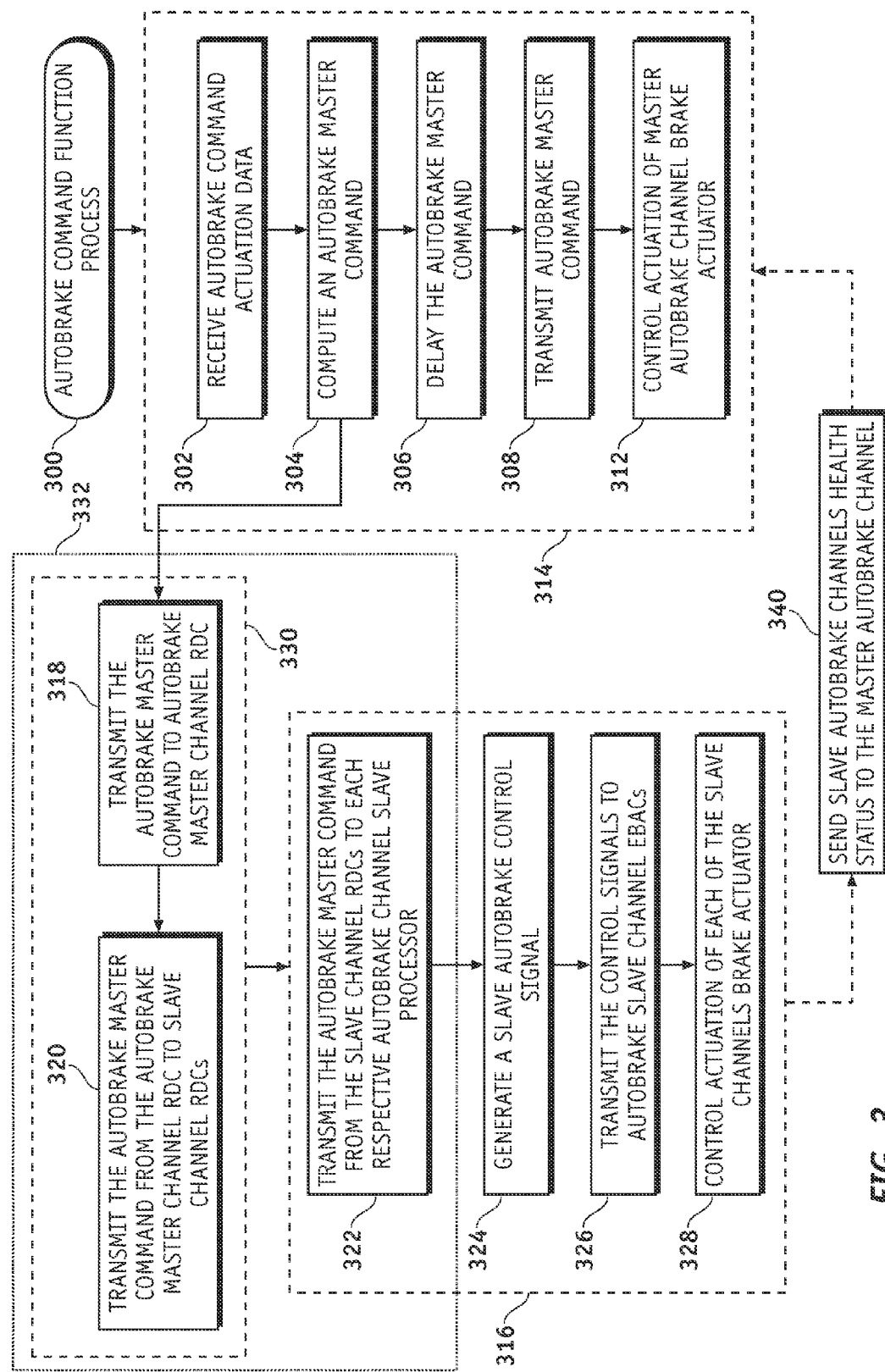
FIG. 3 is a flowchart that illustrates a process for an autobrake function for an electric brake system of an aircraft.

FIG. 3 is a flowchart that illustrates a process 300 for an autobrake function for an electric brake system of an aircraft configured in accordance with an embodiment of the invention. The various tasks performed in connection with process 300 may be performed by software, hardware, firmware, or any combination thereof. For illustrative purposes, the following description of process 300 may refer to elements mentioned above in connection with FIGS. 1-2. In embodiments of the invention, portions of process 300 may be performed by different elements of the described system, e.g., a BSCU, an EBAC, an EBPSU, or the like. It should be appreciated that process 300 may include any number of additional or alternative tasks, the tasks shown in FIG. 3 need not be performed in the illustrated order, and process 300 may be incorporated into a more comprehensive procedure or process having additional functionality not described in detail herein.

In connection with the autobrake function process 300, FIG. 3 depicts two processing branches during process 300 that are interconnected via aircraft network processing branch 330. A master autobrake channel processing branch 314 is shown on the right side of FIG. 3, and a slave autobrake channel processing branch 316 is shown on the left side of FIG. 3. The master autobrake channel of the electric brake system receives autobrake command actuation data (task 302) from the aircraft digital data bus in a continuous or rapidly sampled manner and computes an autobrake master command (task 304) based on the autobrake command actuation data. The autobrake command actuation data may include, without limitation, aircraft deceleration, ground speed, spoiler data, throttle revolver angle and the like. For example, the pilot selects deceleration via a switch in the cockpit, master autobrake computation module then computes an autobrake master command by comparing the actual aircraft deceleration with the pilot input deceleration. The master autobrake computation module then commands 0-100% brake force with antiskid adjustment for each brake actuator controller (EBAC). For example, if the master autobrake command is 62% for the left inboard EBAC and the antiskid adjustment is 2% for the left inboard wheel then the left inboard EBAC gets a 60% master brake command input. The master autobrake command is then published (reference number 332) via the airplane network. To publish the master autobrake command, process 300 transmits the autobrake master command to the master autobrake channel RDC (task 318), the master autobrake channel RDC then transmits the autobrake master command to the slave autobrake channel RDCs (task 320), and transmits the autobrake master command from each of the slave autobrake channel RDCs to each respective slave autobrake channel processor (task 322). The autobrake master command is a common autobrake master command for all brake actuators so that the brakes are applied uniformly to all aircraft wheels at the same time. In this regard, to assure synchronous brake application, the autobrake master command's transmission to its respective EBAC is delayed, concurrently with the publishing process (reference number 332) to the slave BSCU channels, by the master autobrake channel computation module (task 306). The delay is selected based upon the aircraft network transport delay and the time it takes for the brake actuators to reach zero torque point (on the verge of brake application). Process 300 then transmits the autobrake master command on a master autobrake channel to the electric brake actuator controllers (EBACs) after a pre-defined delay (task 308) and controls actuation of master autobrake channel brake actuators with the master autobrake channel control signal (task 312).

The slave autobrake channel processor does not perform any computation on the autobrake master command. The slave autobrake channel acts as a "dummy processor" or data gateway to generate an autobrake control signal that echoes the autobrake master command (task 324) with customized antiskid adjustment for each wheel and controls actuation of each of its corresponding brake actuator(s) with the slave autobrake control signal (task 328). During process 300, the slave autobrake channels send their health status to the master autobrake channel (task 340). In this regard, if there is any kind of error or fault (e.g., antiskid not working, reduced braking capability, uncommanded clamping force, etc.) the master autobrake channel will disarm the autobrake (i.e., discontinue transmission of a master autobrake command to the slave autobrake channels) in order to ensure safety of the aircraft as explained above.

In summary, an autobrake function for an electric brake system of an aircraft, as described herein utilizes a single master autobrake channel configured to generate a master autobrake command, and a plurality of slave autobrake channels configured to receive the autobrake master command via aircraft network. With this approach, a synchronous brake application is achieved so that braking is applied to all aircraft wheels uniformly and simultaneously.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. An electrically actuated and controlled autobraking system for an aircraft, the electrically actuated and controlled autobraking system comprising:
   a master autobrake channel configured to perform a closed loop autobrake control algorithm, wherein the closed Loop autobrake control algorithm generates an autobrake master command, said master autobrake channel comprising a digital channel;
   said master autobrake channel is further configured to delay transmission of the autobrake master command to synchronize brake application in response to the delayed autobrake master command; and
   a plurality of slave autobrake digital channels, each being configured to receive the autobrake master command, wherein each of the slave autobrake channels commands a brake application based on the received autobrake master command without any further processing, with an exception of antiskid adjustment, said slave autobrake channels comprising digital channels.

2. A system according to claim 1, wherein the master autobrake channel further comprises a master computation module coupled to a master autobrake channel brake system control unit (BSCU) and configured to compute the autobrake master command.

3. A system according to claim 2, wherein the master computation module is further configured to delay transmission of the autobrake master command to electric brake actuator controls (EBACs).

4. A system according to claim 3, wherein the master autobrake channel further comprises an electric brake actuator control (EBAC) coupled to the master autobrake channel BSCU and configured to receive the delayed autobrake master command, wherein the master autobrake channel controls a portion of electric brake actuator controls (EBACs) which is configured to receive the delayed autobrake master command.

5. A system according to claim 2, further comprising a master autobrake channel remote data concentrator (ROC) coupled to the master autobrake channel BSCU and configured to receive the autobrake master command.

6. A system according to claim 1, wherein each of the slave autobrake channels further comprises:
   an autobrake channel slave processor coupled to a slave autobrake BSCU and configured to receive the autobrake master command; and
   an electric brake actuator control (EBAC) coupled to the slave autobrake channel BSCU and configured to generate a brake actuation signal in response to the autobrake master command.

7. A system according to claim 6, wherein the slave autobrake channels are configured to independently control actuation of each of their respective EBACs.

8. A system according to claim 1, wherein the slave autobrake channels are configured to send their health status to the master autobrake channel.

9. A method for an autobrake function for an electrically actuated and controlled brake system of an aircraft, the method comprising:
   receiving autobrake command actuation data by a master autobrake channel, said master autobrake channel comprising a digital channel;
   computing an autobrake master command in closed loop control mode based upon the autobrake command actuation data, said computing comprising said master autobrake channel;
   sending the autobrake master command to slave autobrake channels, wherein each slave autobrake channel has one or more corresponding slave autobrake channel brake actuators that it is controlling, said slave autobrake channels comprising digital channels;
   generating a slave autobrake control signal for each of the slave autobrake channels in response to the autobrake master command; and controlling actuation of the slave autobrake channel brake actuators with the slave autobrake control signal;

said step of controlling comprises delaying the autobrake master command to obtain a delayed autobrake master command to synchronize brake application in response to the delayed autobrake master command.

10. A method according to claim 9, further comprising:

transmitting the delayed autobrake master command to electric brake actuator controls (EBACs);

transmitting a master autobrake channel control signal in response to the delayed autobrake master command; and controlling actuation of electric brake actuators with the master autobrake channel control signal.

11. A method according to claim 10, wherein the delaying step further comprises selecting a time delay such that a synchronous brake application is obtained.

12. A method for an autobrake function of an electrically actuated and controlled brake system of an aircraft, the method comprising:

receiving autobrake command actuation data;

computing an autobrake master command based upon the autobrake command actuation data; and synchronizing brake application in response to the autobrake master command, said autobrake master command said master autobrake command sent from a master autobrake channel to slave autobrake channels, said master autobrake channel and said slave autobrake channels comprising digital channels;

said step of synchronizing comprises delaying the autobrake master command to obtain a delayed autobrake application on a master autobrake channel to synchronize brake application in response to the delayed autobrake master command.

13. A method according to claim 12, wherein the synchronizing step further comprises:

transmitting the autobrake master command on a master autobrake channel to the electric brake actuator controls (EBACs) after a pre-defined delay:

controlling actuation of master autobrake channel brake actuators with the master autobrake channel control signal; and concurrently;

publishing the autobrake master command on a plurality of slave autobrake channels, wherein each slave autobrake channel is in control of a plurality of brake actuators;

generating a slave autobrake control signal for each of the slave autobrake channels in response to the autobrake master command; and controlling actuation of slave autobrake channel brake actuators with an slave autobrake control signal.

14. A method according to claim 13, wherein the delaying step further comprises selecting a time delay such that each of the slave autobrake channel brake actuators and the master autobrake channel brake actuators synchronously apply brakes to wheels of the aircraft.

15. A method according to claim 12, wherein the slave autobrake channels send their health status to the master autobrake channel.

* * * * *